(12) United States Patent
Chen et al.

(10) Patent No.: US 10,645,376 B2
(45) Date of Patent: May 5, 2020

(54) SYSTEMS AND METHODS FOR PRESENTING CONTENT

(71) Applicant: Facebook, Inc., Menlo Park, CA (US)

(72) Inventors: Chien-Nan Chen, Champaign, IL (US); David Young Joon Pio, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 41 days.

(21) Appl. No.: 15/488,485

(22) Filed: Apr. 16, 2017

(65) Prior Publication Data

US 2018/0302602 A1 Oct. 18, 2018

(51) Int. Cl.
| | |
|---|---|
| *H04N 13/366* | (2018.01) |
| *H04N 13/398* | (2018.01) |
| *G06F 3/01* | (2006.01) |
| *H04N 21/218* | (2011.01) |
| *H04N 21/44* | (2011.01) |
| *H04N 21/6587* | (2011.01) |
| *H04N 21/439* | (2011.01) |
| *H04N 21/81* | (2011.01) |
| *H04N 5/232* | (2006.01) |

(52) U.S. Cl.
CPC ........... *H04N 13/366* (2018.05); *G06F 3/013* (2013.01); *H04N 13/398* (2018.05); *H04N 21/21805* (2013.01); *H04N 21/4394* (2013.01); *H04N 21/44008* (2013.01); *H04N 21/6587* (2013.01); *H04N 21/816* (2013.01); *H04N 5/23238* (2013.01)

(58) Field of Classification Search
CPC . H04N 13/366; H04N 13/398; H04N 5/23238
See application file for complete search history.

(56) References Cited

U.S. PATENT DOCUMENTS

| | | | |
|---|---|---|---|
| 2007/0229396 A1* | 10/2007 | Rajasingham | G06F 3/013 345/8 |
| 2013/0127980 A1* | 5/2013 | Haddick | G06F 3/013 348/14.08 |
| 2014/0266988 A1* | 9/2014 | Fisher | G02B 27/017 345/8 |
| 2014/0304724 A1* | 10/2014 | Shin | H04N 21/442 725/10 |
| 2016/0005435 A1* | 1/2016 | Campbell | H04N 9/806 386/240 |
| 2016/0026253 A1* | 1/2016 | Bradski | G02B 27/225 345/8 |
| 2016/0191891 A1* | 6/2016 | Gilpin | H04N 5/77 386/224 |
| 2016/0262608 A1* | 9/2016 | Krueger | A61B 3/0041 |
| 2017/0168482 A1* | 6/2017 | Kratz | G05D 1/0038 |

* cited by examiner

*Primary Examiner* — Thai Q Tran
*Assistant Examiner* — Sunghyoun Park
(74) *Attorney, Agent, or Firm* — Sheppard Mullin Richter & Hampton LLP

(57) ABSTRACT

Systems, methods, and non-transitory computer-readable media can determine a first position corresponding to a user focal point during presentation of a given scene of a content item. A celestial representation of the given scene is determined. The celestial representation identifies one or more audio-based points of interest in the scene. A second position corresponding to the user focal point is determined based at least in part on the celestial representation and the first position. The second position is predicted to be the position of the user focal point during presentation of the scene.

20 Claims, 15 Drawing Sheets

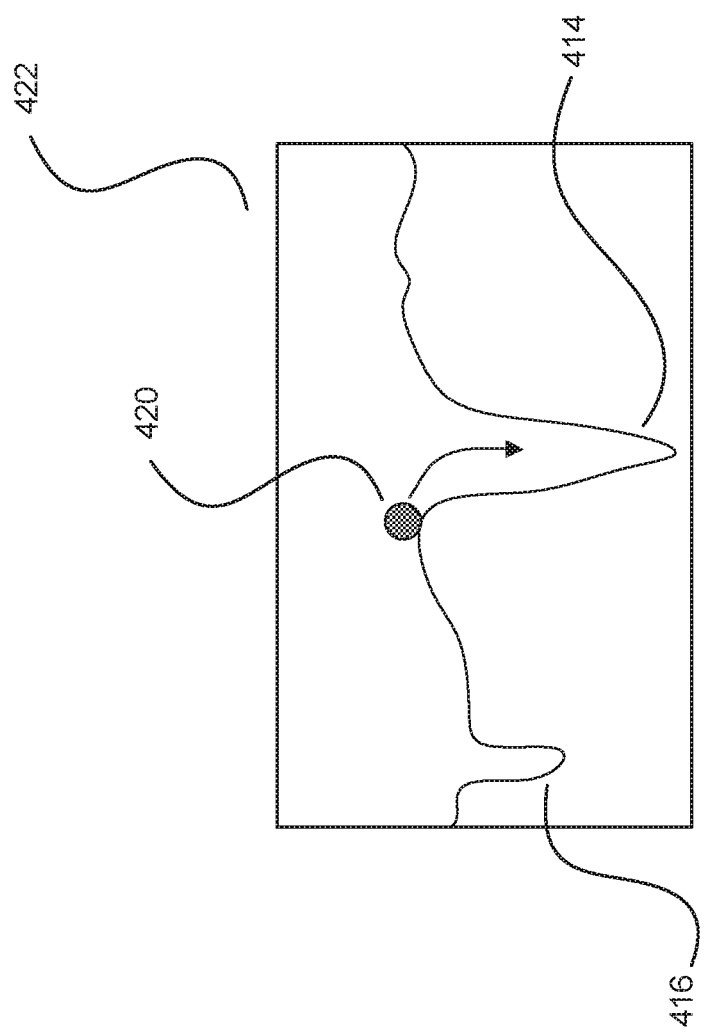

SYSTEMS AND METHODS FOR PRESENTING CONTENT

FIELD OF THE INVENTION

The present technology relates to the field of content provision. More particularly, the present technology relates to techniques for presenting content through computing devices.

BACKGROUND

Today, people often utilize computing devices (or systems) for a wide variety of purposes. Users can operate their computing devices to, for example, interact with one another, create content, share content, and access information. Under conventional approaches, content items (e.g., images, videos, audio files, etc.) can be made available through a content sharing platform. Users can operate their computing devices to access the content items through the platform. Typically, the content items can be provided, or uploaded, by various entities including, for example, content publishers and also users of the content sharing platform. In some instances, the content items can be categorized and/or curated.

SUMMARY

Various embodiments of the present disclosure can include systems, methods, and non-transitory computer readable media configured to determine a first position corresponding to a user focal point prior to presenting a given frame of a content item. A landscape representation of the given frame is determined. The landscape representation describes the respective popularity of one or more regions in the frame as a topology. A second position corresponding to the user focal point is determined based at least in part on the landscape representation and the first position. The second position is predicted to be the position of the user focal point when presenting the given frame.

In some embodiments, the user focal point corresponds to a direction of a viewport through which the content item is presented.

In some embodiments, the systems, methods, and non-transitory computer readable media are configured to obtain heat map data corresponding to the given frame, the heat map data representing user view activity for regions in the frame and generate the landscape representation based at least in part on the heat map data.

In some embodiments, popular regions in the frame are represented in the landscape representation as valleys, and wherein the depth of a valley corresponding to a given popular region is determined based on a number of user views corresponding to the given popular region.

In some embodiments, unpopular regions in the frame are represented in the landscape representation as peaks, and wherein the height of a peak corresponding to a given unpopular region is determined based on a number of user views corresponding to the given unpopular region.

In some embodiments, the systems, methods, and non-transitory computer readable media are configured to apply a simulation using the landscape representation and a particle placed in the landscape representation at the first position, wherein the simulation causes the particle to move toward a given region in the landscape representation.

In some embodiments, the simulation involves applying a simulated gravitational force to the particle.

In some embodiments, the simulation involves applying an initial velocity and acceleration to the particle, the initial velocity and acceleration being determined based at least in part on a velocity and acceleration corresponding to the user focal point prior to presenting the given frame.

In some embodiments, the velocity and acceleration of the user focal point is determined based at least in part on movement of a computing device through which the content item is being presented.

In some embodiments, the content item is a virtual reality content item created by stitching together a set of video streams that capture one or more scenes.

Various embodiments of the present disclosure can include systems, methods, and non-transitory computer readable media configured to determine a first position corresponding to a user focal point during presentation of a given scene of a content item. A celestial representation of the given scene is determined. The celestial representation identifies one or more audio-based points of interest in the scene. A second position corresponding to the user focal point is determined based at least in part on the celestial representation and the first position. The second position is predicted to be the position of the user focal point during presentation of the scene.

In some embodiments, the user focal point corresponds to a direction of a viewport through which the scene of the content item is presented.

In some embodiments, the systems, methods, and non-transitory computer readable media are configured to determine the one or more audio-based points of interest in the scene based at least in part on one or more spatial audio streams corresponding to the content item, determine a respective popularity for each of the audio-based points of interest, and plot the audio-based points of interest as planets in three-dimensional space.

In some embodiments, each audio-based point of interest corresponds to a region in the scene from which sound originates.

In some embodiments, the popularity of an audio-based point of interest is determined based on the number of times a region corresponding to the audio-based point of interest was historically viewed.

In some embodiments, a planet corresponding to an audio-based point of interest is assigned a mass, and wherein the mass is based on the popularity of the audio-based point of interest.

In some embodiments, the systems, methods, and non-transitory computer readable media are configured to apply a simulation using the celestial representation and an object placed in the celestial representation at the first position, wherein the simulation causes the object to move toward at least one planet in the celestial representation, wherein the second position is determined based on an audio-based point of interest corresponding to the planet.

In some embodiments, the systems, methods, and non-transitory computer readable media are configured to determine the audio-based point of interest that corresponds to the planet to which the object moves toward, determine a region in the scene corresponding to the audio-based point of interest, and identify the region as the second position.

In some embodiments, each planet in the celestial representation exerts a simulated gravitational pull on the object.

In some embodiments, the scene of the content item is created by stitching together a set of video streams that capture views of the scene.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIGS. 4A-D illustrate examples of performing head tracking prediction using a landscape model, according to an embodiment of the present disclosure.

Figure 1:
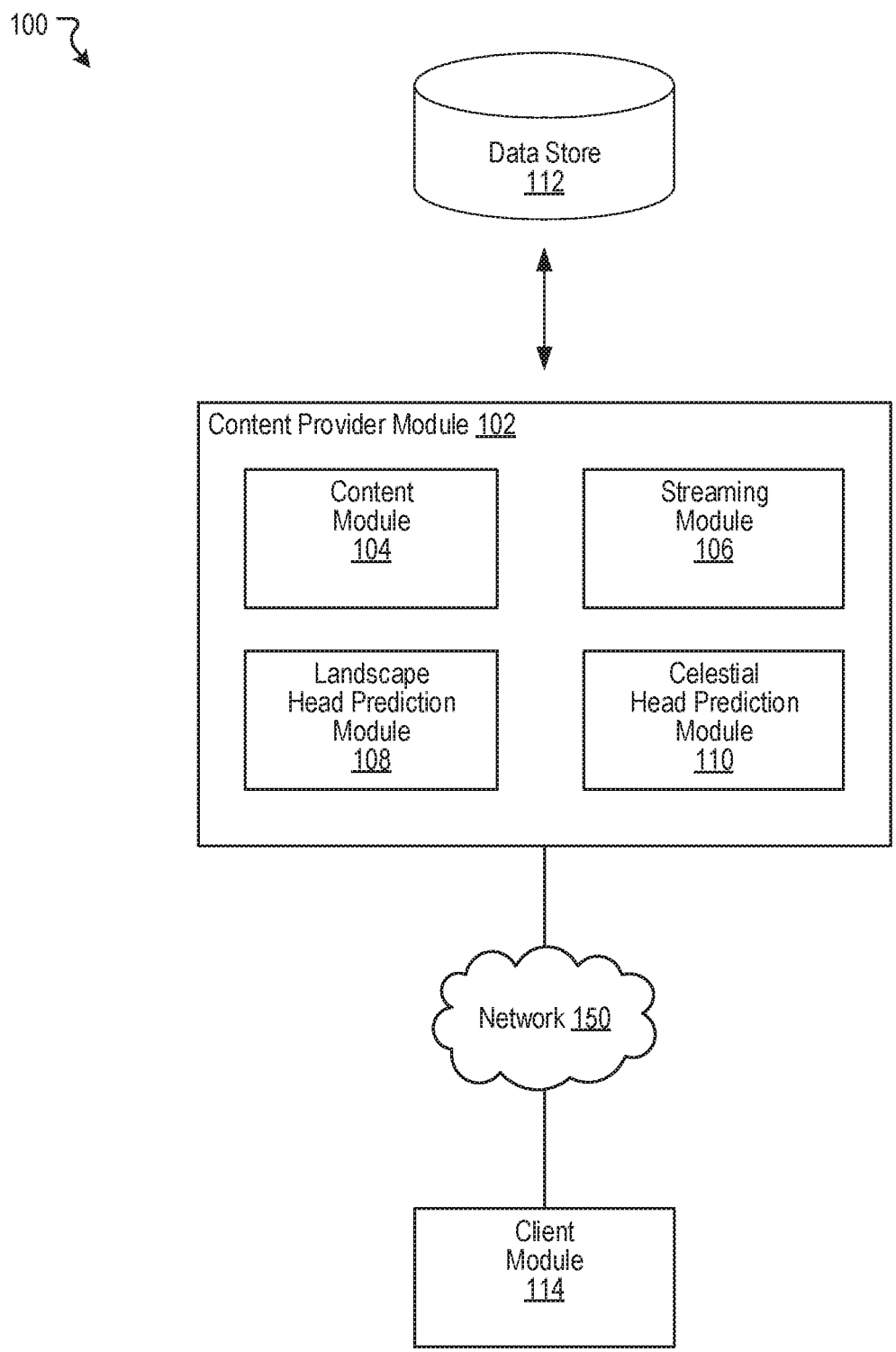
FIG. 1 illustrates an example system including an example content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Presenting Content

People use computing devices (or systems) for a wide variety of purposes. As mentioned, under conventional approaches, a user can utilize a computing device to share content items (e.g., documents, images, videos, audio, etc.) with other users. Such content items can be made available through a content sharing platform. Users can operate their computing devices to access the content items through the platform. Typically, the content items can be provided, or uploaded, by various entities including, for example, content publishers and also users of the content sharing platform.

In some instances, a user can access virtual reality content through a content provider. Such virtual reality content can be presented, for example, in a viewport that is accessible through a computing device (e.g., a virtual reality device, headset, or any computing device capable of presenting virtual reality content). In general, a virtual reality content item (or immersive video) corresponds to any virtual reality media that encompasses (or surrounds) a viewer (or user). Some examples of virtual reality content items include spherical videos, half sphere videos (e.g., 180 degree videos), arbitrary partial spheres, 225 degree videos, and 3D 360 videos. Such virtual reality content items need not be limited to videos that are formatted using a spherical shape but may also be applied to immersive videos formatted using other shapes including, for example, cubes, pyramids, and other shape representations of a video recorded three-dimensional world. In some embodiments, a virtual reality content item can be created by stitching together various video streams (or feeds) that were captured by cameras placed at particular locations and/or positions to capture a view of the scene (e.g., 180 degree view, 225 degree view, 360 degree view, etc.). Once stitched together, a user can access, or present (e.g., playback), the virtual reality content item. Generally, while accessing the virtual reality content item, the user can zoom and change the direction (e.g., pitch, yaw, roll) of the viewport to access different portions of the scene in the virtual reality content item. The direction of the viewport can be used to determine which stream of the virtual reality content item is presented.

As mentioned, a virtual reality content item can be created by stitching together various video streams (or feeds). In general, when accessing the virtual reality content item through a viewport, a computing device can apply various techniques for performing head tracking predictions (or viewport tracking predictions) to determine changes to the direction of the viewport during presentation of the virtual reality content item. The direction of the viewport at a given time can be used to determine a video stream of the virtual reality content item that corresponds to the viewport direction. This video stream can then be presented through the viewport. In general, conventional approaches to head tracking prediction may require numerous calculations to be performed during the presentation of a virtual reality content item. These calculations, which may involve evaluating a vast amount of sensor data, can degrade the overall user experience. Accordingly, such conventional approaches may not be effective in addressing these and other problems arising in computer technology.

An improved approach overcomes the foregoing and other disadvantages associated with conventional approaches. In various embodiments, landscape models can be generated to make head tracking (or viewport tracking) predictions during presentation of content items (e.g., virtual reality content items). For example, in some embodiments, a landscape representation can be constructed for one or more frames of a virtual reality content item based on heat map data for the frame. The heat map data can describe user view activity for various regions in a frame. In some embodiments, a landscape representation of a frame is generated so that popular regions of the frame that were viewed more frequently are represented as valleys and unpopular regions of the frame that were viewed less frequently are represented as peaks. In some embodiments, the landscape representation of the frame is modeled in the general shape of a sphere with the peaks and valleys reflected on its surface. When the frame is being presented to a user, a particle (e.g., a ball, marble, etc.) that corresponds to the user's focal point can be positioned in the landscape model generated for the frame. In such embodiments, a simulation is performed to predict changes to the particle's position in the landscape representation. These changes to the particle may be determined based on an initial velocity and acceleration of the particle (e.g., as determined by the user's head movement), gravity, and the gradient of the region in which the particle was positioned. The position of the particle after performing the simulation will generally correspond to a region of the frame to where the user's attention is likely to be drawn.

In various embodiments, celestial models can be generated to make head tracking (or viewport tracking) predictions during presentation of content items (e.g., virtual reality content items). For example, in some embodiments, a respective celestial representation can be constructed for each scene captured in a virtual reality content item. As mentioned, views of a scene can be captured by cameras placed at particular locations and/or positions. The video streams (or feeds) captured by these cameras can be stitched together to provide an immersive view of the scene (e.g., 180 degree, 225 degree, 360 degree, etc.). When constructing a celestial representation of a scene, any audio-based points of interest in the scene from which sound originates during presentation of the content item can be plotted as planets in three-dimensional space. In some embodiments, the celestial representation of the scene is modeled in the shape of a sphere. These audio-based points of interest may correspond to sound that originates in any of the video streams that capture a view of the scene. In some embodiments, these audio-based points of interest can each be assigned a respective mass. In some embodiments, popular audio-based points of interest are represented as planets having a larger mass and unpopular audio-based points of interest are represented as planets having a reduced mass. In some embodiments, the popularity of an audio-based point of interest is measured based on the number of views received by the audio-based point of interest during presentation of the scene. When the scene is accessed during presentation of the content item, an object that corresponds to the user's focal point can be positioned in the celestial representation generated for the scene. In such embodiments, a simulation is performed to predict changes to the object's position in the celestial representation. In this simulation, each of the planets (e.g., audio-based points of interest) exert a corresponding gravitational pull on the object in three-dimensional space. The amount of gravity exerted by a given planet can be determined based on the planet's mass and the distance between the planet and the object. The object will typically move toward a planet upon completion of the simulation. The planet (e.g., audio-based point of interest) to which the object moves toward can be correlated to a region of the scene to where the user's attention is likely to be drawn.

By making head tracking (or viewport tracking) predictions using physics-based models, the approaches described herein can leverage resources (e.g., hardware and software) that have been optimized for physics-based computations. As a result, the approaches described herein can improve the speed and accuracy with which such head tracking (or viewport tracking) predictions are made.

FIG. 1 illustrates an example system 100 including an example content provider module 102, according to an embodiment of the present disclosure. As shown in the example of FIG. 1, the content provider module 102 can include a content module 104, a streaming module 106, a landscape head prediction module 108, and a celestial head prediction module 110. In some instances, the example system 100 can include at least one data store 112. A client module 114 can interact with the content provider module 102 over one or more networks 150 (e.g., the Internet, a local area network, etc.). The client module 114 can be implemented in a software application running on a computing device (e.g., a virtual reality device, headset, or any computing device capable of presenting virtual reality content). In various embodiments, the network 150 can be any wired or wireless computer network through which devices can exchange data. For example, the network 150 can be a personal area network, a local area network, or a wide area network, to name some examples. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user computing device or client computing system. For example, the content provider module 102, or at least a portion thereof, can be implemented as or within an application (e.g., app), a program, or an applet, etc., running on a user computing device or a client computing system, such as the user device 910 of FIG. 9. Further, the content provider module 102, or at least a portion thereof, can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 930 of FIG. 9. It should be understood that there can be many variations or other possibilities.

In some embodiments, the content provider module 102 can be configured to communicate and/or operate with the at least one data store 112 in the example system 100. In various embodiments, the at least one data store 112 can store data relevant to the function and operation of the content provider module 102. One example of such data can be content items (e.g., virtual reality content items) that are available for access (e.g., streaming). In some implementations, the at least one data store 112 can store information associated with the social networking system (e.g., the social networking system 930 of FIG. 9). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data. It should be appreciated that there can be many variations or other possibilities.

In various embodiments, the content module 104 can provide access to various types of content items (e.g., virtual reality content items, immersive videos, etc.) to be presented through a viewport. This viewport may be provided through a display of a computing device (e.g., a virtual reality computing device) in which the client module 114 is implemented, for example. In some instances, the computing device may be running a software application (e.g., social networking application) that is configured to present content items. Some examples of virtual reality content can include videos composed using monoscopic 360 degree views or videos composed using stereoscopic 180 degree views, to name some examples. In various embodiments, virtual reality content items can capture views (e.g., 180 degree views, 225 degree views, 360 degree views, etc.) of one or more scenes over some duration of time. Such scenes may be captured from the real world and/or be computer generated. Further, a virtual reality content item can be created by stitching together various video streams (or feeds) that were captured by cameras placed at particular locations and/or positions to capture a view of the scene. Such streams may be pre-determined for various directions, e.g., angles (e.g., 0 degree, 30 degrees, 60 degrees, etc.), accessible in a virtual reality content item. Once stitched together, a user can access, or present, the virtual reality content item to view a portion of the virtual reality content item along some direction (or angle). Generally, the portion of the virtual reality content item (e.g., stream) shown to the user can be determined based on the location and direction of the user's viewport in three-dimensional space. In some embodiments, a virtual reality content item (e.g., stream, immersive video, spherical video, etc.) may be composed using multiple content items. For example, a content item may be composed using a first content item (e.g., a first live broadcast) and a second content item (e.g., a second live broadcast).

In one example, the computing device in which the client module 114 is implemented can request presentation of a virtual reality content item (e.g., spherical video). In this example, the streaming module 106 can provide one or more streams of the virtual reality content item to be presented through the computing device. The stream(s) provided will typically correspond to a direction of the viewport in the virtual reality content item being accessed. As presentation of the virtual reality content item progresses, the client module 114 can continually provide the content provider module 102 with information describing the direction at which the viewport is facing. The streaming module 106 can use this information to determine which stream to provide the client module 114. For example, while accessing the virtual reality content item, the client module 114 can notify the content provider module 102 that the viewport is facing a first direction. Based on this information, the streaming module 106 can provide the client module 114 with a first stream of the virtual reality content item that corresponds to the first direction. In some embodiments, different versions (e.g., different qualities) of streams of virtual reality content items can be provided based on predicted changes to a user's viewport using any of the approaches described herein.

In some embodiments, the landscape head prediction module 108 can be configured to generate landscape models for content items (e.g., virtual reality content items). In some embodiments, a landscape model for a given virtual reality content item can be constructed by generating respective landscape representations for some, or all, of the frames of the virtual reality content item. These landscape representations can be used to make head tracking (or viewport tracking) predictions. More details describing the landscape head prediction module 108 will be provided below in reference to FIG. 2.

In some embodiments, the celestial head prediction module 110 can be configured to generate celestial models for content items (e.g., virtual reality content items). In some embodiments, a celestial model for a given virtual reality content item can be constructed by generating individual celestial representations for some, or all, of the scenes of the virtual reality content item. These celestial representations can be used to make head tracking (or viewport tracking) predictions. More details describing the celestial head prediction module 110 will be provided below in reference to FIG. 3.

Figure 2:
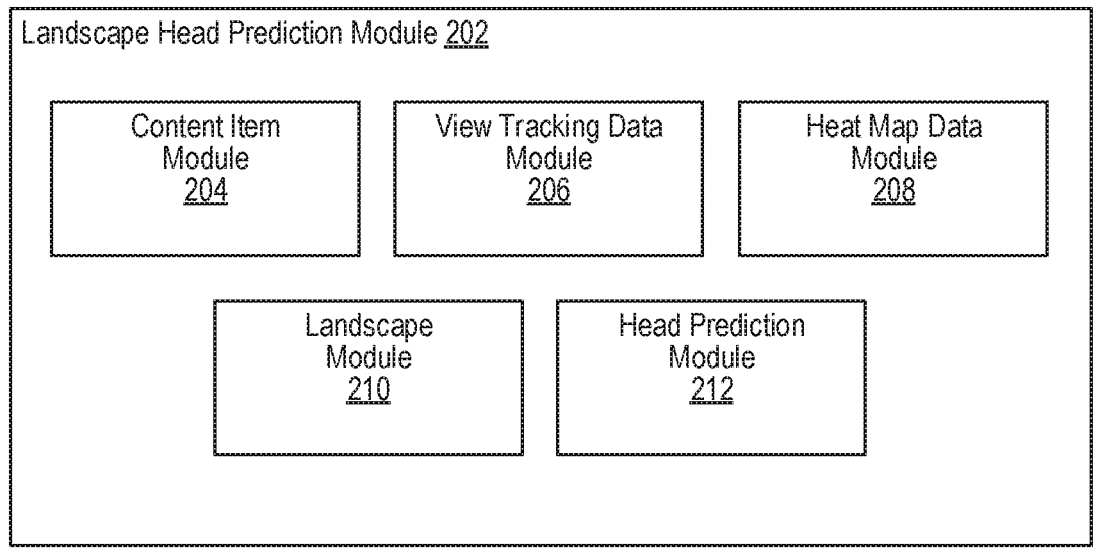
FIG. 2 illustrates an example of a landscape head prediction module, according to an embodiment of the present disclosure.

FIG. 2 illustrates an example of a landscape head prediction module 202, according to an embodiment of the present disclosure. In some embodiments, the landscape head prediction module 108 of FIG. 1 can be implemented with the landscape head prediction module 202. As shown in the example of FIG. 2, the landscape head prediction module 202 can include a content item module 204, a view tracking data module 206, a heat map data module 208, a landscape module 210, and a head prediction module 212.

In various embodiments, the content item module 204 can be configured to obtain content items for which landscape models are to be generated. Such content items may include videos (e.g., virtual reality content items, immersive videos, etc.). In general, a virtual reality content item (or immersive video) corresponds to any virtual reality media that encompasses (or surrounds) a viewer (or user). Some examples of virtual reality content items include spherical videos, half sphere videos (e.g., 180 degree videos), arbitrary partial spheres, 225 degree videos, and 3D 360 videos. Such virtual reality content items need not be limited to videos that are formatted using a spherical shape but may also be applied to immersive videos formatted using other shapes including, for example, cubes, pyramids, and other shape representations of a video recorded three-dimensional world.

In some embodiments, the view tracking data module 206 can be configured to obtain respective view tracking data for a content item for which a landscape model is being generated. For example, view tracking data for a given content item may be collected for each user (or viewer) that has accessed the content item. The view tracking data for a user may identify regions that were accessed through the user's viewport during presentation of the content item. Such view tracking data may be collected for each frame corresponding to the content item. In some embodiments, a user's view tracking data for a content item can be determined based on changes to the user's viewport during presentation of the content item. Such changes to the viewport may be measured using various approaches that can be used either alone or in combination. For example, changes to the viewport may be measured using sensor data (e.g., gyroscope data, inertial measurement unit data, etc.) that describes movement of the computing device being used to present the content item. In another example, changes to the viewport can be measured using gesture data describing the types of gestures (e.g., panning, zooming, etc.) that were performed during presentation of the content item. Some other examples for measuring changes to the viewport include using input device data that describes input operations (e.g., mouse movement, dragging, etc.) performed during presentation of the content item, headset movement data that describes changes in the viewport direction during presentation of the content item, and eye tracking data collected during presentation of the content item, to name some examples.

In some embodiments, the heat map data module 208 can be configured to generate (or obtain) heat maps for the content item for which the landscape model is being generated. In some embodiments, heat maps for a given content item may be generated based on view tracking data for the content item. As mentioned, the view tracking data module 206 can obtain respective view tracking data for users that viewed a content item. Each user's view tracking data can indicate which regions of a given frame (or set of frames) were accessed using a user's viewport during presentation of a content item. That is, for any given frame in the content item, the heat map data module 208 can generate (or obtain) user-specific heat maps that graphically represent regions in the frame that were of interest to a given user. In some embodiments, user-specific heat maps for a given content item can be combined to generate aggregated heat maps that represent aggregated regions of interest in frames corresponding to the content item. Thus, for example, the respective user-specific heat maps can be aggregated on a frame-by-frame basis so that each frame of the content item is associated with its own aggregated heat map that graphically identifies the regions of interest in the frame. These regions of interest can correspond to various points of interest that appear in frames and were determined to be of interest to some, or all, of the users that viewed the content item. In some embodiments, the heat map data module 208 can obtain machine-generated heat maps for content items using one or more machine learning algorithms that were trained to predict regions of interest in frames.

The landscape module 210 can be configured to generate respective landscape representations for some, or all, frames of the content item for which the landscape model is being generated. In some embodiments, a landscape representation for a given frame is determined based on heat map data for the frame. In some embodiments, the heat map data can describe aggregated user view activity for the frame. The heat map data can indicate the respective popularities of regions in the frame among various users that viewed the frame. For example, a region in the frame that was viewed by 80 percent of the users will be represented in the heat map as being more popular than other regions in the frame. In some embodiments, the popularity of a region is determined based on view count. For example, the respective positions of user focal points when viewing the frame can be plotted to determine which regions were popular. In some embodiments, the respective positions of user focal points can be used to determine the size of the popular region. In general, a region of a frame may correspond to a pixel or group of pixels in the frame. This heat map data for the frame can be used to construct the landscape representation (e.g., topology) for the frame. For example, the landscape representation may be constructed using generally known models for landscape construction (e.g., landscape gradient model). In some embodiments, the landscape representation of the frame is generated by placing a normal kernel over the regions of the frame. In such embodiments, the popular regions of the frame that were viewed more frequently are represented as valleys and unpopular regions of the frame that were viewed less frequently are represented as peaks. For example, a region that received more views than other regions in the frame can be represented as a valley. In some embodiments, the depth of this valley is a measure of the number of views that correspond to the region, as determined from the heat map data. Similarly, a region that received fewer views than other regions in the frame can be represented as a peak. In some embodiments, the height of this peak is a measure of the number of views that correspond to the region, as determined from the heat map data.

In some embodiments, landscape representations generated for frames of content items can be compressed and sent to user computing devices in advance. In such embodiments, the landscape representations for frames of a given content item can be used to predict user view directions during presentation of the content item as described above. In some embodiments, a video stream of the content item that corresponds to a predicted view direction can be provided for presentation at a first (e.g., higher) video quality while video streams corresponding to the remaining view directions of the content item can be provided at a second (e.g., lower) video quality.

The head prediction module 212 can be configured to use the landscape model generated for the content item to make head tracking (or viewport tracking) predictions. For example, the content item for which the landscape model was generated can be accessed through a computing device being operated by a user. When a given frame is being presented, a simulation can be performed using the landscape representation for the frame. For example, a particle (e.g., a ball, marble, etc.) that corresponds to the user's focal point can be positioned in the landscape representation. The user's focal point generally corresponds to the direction being viewed by the user. The focal point may be determined, for example, based on a direction corresponding to a viewport associated with the computing device. The simulation can be performed to predict changes to the particle's position in the landscape representation. These changes to the particle may be determined based on various simulated forces affecting the particle. For example, in some embodiments, the direction in which the particle moves can be affected by an initial velocity and acceleration of the particle. This initial velocity and acceleration may be measured based on a velocity and acceleration corresponding to the user's head movement as measured using the computing device through which the content item is being accessed. For example, if the computing device is a virtual reality headset, the rate at which the headset is moving when the frame is presented can be used to determine the initial velocity and acceleration of the particle. In such embodiments, the direction in which the particle moves can also be affected by a gravitational force that is simulated with respect to the landscape representation of the frame. In addition, the movement of the particle can also be affected based on a gradient of the landscape representation in which the particle was initially positioned. In some embodiments, no frictional forces are applied to the particle when conducting the simulation. After performing the simulation, the resulting position of the particle in the landscape representation can be correlated back to a region in the frame. This position in the frame is the predicted region to which the user's attention is likely to be drawn. In general, the parameters used in performing the simulation are tunable and need not correspond to real world values. For example, the acceleration of gravity in the simulation can be tuned depending on the implementation and need not correspond to the acceleration of gravity as experienced on Earth. More details describing the simulation will be provided below in reference to FIGS. 4A-D.

In some embodiments, a landscape model can be generated to make view tracking predictions for regions in two-dimensional images using the approaches described above. In some embodiments, a landscape model can be generated to make view tracking predictions for user interfaces using the approaches described above. For example, the approaches can be used to predict options that are likely to be accessed by users while interacting with a menu interface. In various embodiments, such predictions may be made for both two-dimensional and three-dimensional user interfaces.

Figure 3:
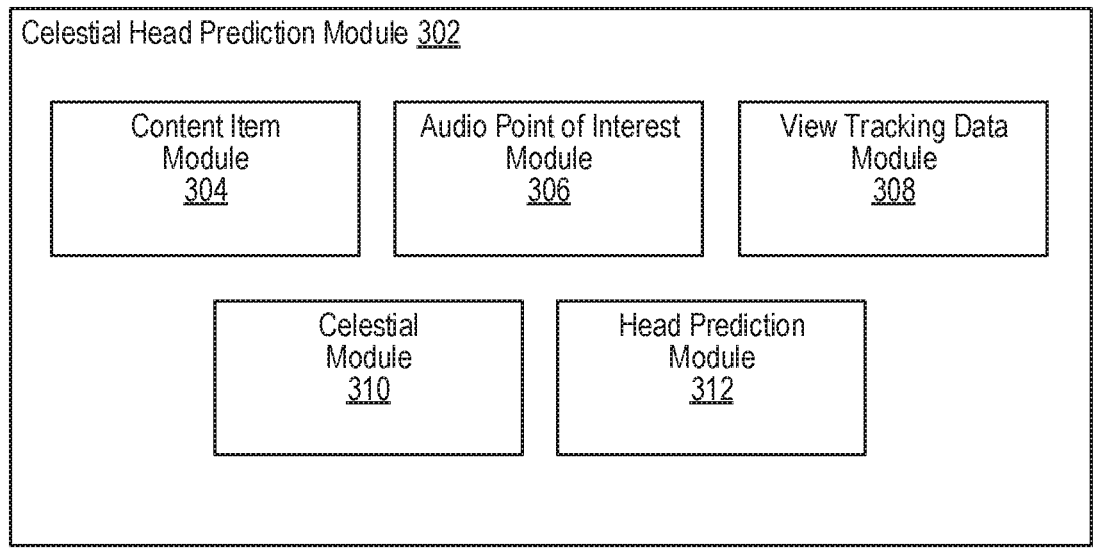
FIG. 3 illustrates an example of a celestial head prediction module, according to an embodiment of the present disclosure.

FIG. 3 illustrates an example of a celestial head prediction module 302, according to an embodiment of the present disclosure. In some embodiments, the celestial head prediction module 110 of FIG. 1 can be implemented with the celestial head prediction module 302. As shown in the example of FIG. 3, the celestial head prediction module 302 can include a content item module 304, an audio point of interest module 306, a view tracking data module 308, a celestial module 310, and a head prediction module 312.

In various embodiments, the content item module 304 can be configured to obtain content items for which celestial models are to be generated. Such content items may include videos (e.g., virtual reality content items, immersive videos, etc.). In general, a virtual reality content item (or immersive video) corresponds to any virtual reality media that encompasses (or surrounds) a viewer (or user). Some examples of virtual reality content items include spherical videos, half sphere videos (e.g., 180 degree videos), arbitrary partial spheres, 225 degree videos, and 3D 360 videos. Such virtual reality content items need not be limited to videos that are formatted using a spherical shape but may also be applied to immersive videos formatted using other shapes including, for example, cubes, pyramids, and other shape representations of a video recorded three-dimensional world.

In some embodiments, the audio point of interest module 306 can be configured to determine audio-based points of interest in scenes of content items. In such embodiments, the audio point of interest module 306 can determine audio-based points of interest for a content item based on its corresponding audio data. For example, a scene in a content item can be captured by cameras placed at particular locations and/or positions. The video streams (or feeds) captured by these cameras can be stitched together to provide an immersive view of the scene (e.g., 180 degree, 225 degree, 360 degree, etc.). Each of these video streams will typically have a corresponding spatial audio stream (e.g., 180 degree audio, 225 degree audio, 360 degree audio, etc.). Thus, the audio point of interest module 306 can analyze each of these spatial audio streams to identify audio-based points of interest. For example, a scene in a virtual reality content item may be composed of at least a first video stream (e.g., front view) in which a dog is barking and a second video stream (e.g., rear view) in which a radio is playing. In this example, the audio point of interest module 306 can determine the dog as a first audio-based point of interest that corresponds to a region in one or more frames of the first video stream. This determination can be made by analyzing the spatial audio stream corresponding to the first video stream. Similarly, the audio point of interest module 306 can determine the radio as a second audio-based point of interest that corresponds to a region in one or more frames of the second video stream. This determination can be made by analyzing the spatial audio stream corresponding to the second video stream. In some embodiments, a threshold amount of sound must originate from a given region before that region is labeled as an audio-based point of interest. The amount of sound originating from an audio-based point of interest may be measured using conventional approaches (e.g., measuring decibels).

In some embodiments, the view tracking data module 308 can be configured to obtain respective view tracking data for the content item for which a celestial model is being generated. The view tracking data for the content item may be collected using the approaches described above in reference to FIG. 2. In some embodiments, the view tracking data module 308 correlates the view tracking data to the audio-based points of interest that were determined for the content item. That is, the view tracking data module 308 can determine the number of times a region corresponding to a given audio-based point of interest was viewed during presentation of the content item. This information can be determined using historical viewer data. For example, a given scene in the content item may include a first audio-based point of interest and a second audio-based point of interest. In this example, the view tracking data module 308 can determine a respective view count for a region corresponding to the first audio-based point of interest and a region corresponding to the second audio-based point of interest. These view counts can be used to measure the respective popularities of each of the audio-based points of interest. In some embodiments, the audio-based points of interest and their respective popularities are used to construct a celestial representation for the scene, as described below. In some embodiments, a view count for an audio-based point of interest corresponds to the number of times users viewed the audio-based point of interest during presentation of the content item (or scene of the content item). In some embodiments, a view count for an audio-based point of interest corresponds to the number of unique users viewed the audio-based point of interest during presentation of the content item (or scene of the content item).

In various embodiments, the celestial module 310 can generate celestial models for making head tracking (or viewport tracking) predictions during presentation of content items (e.g., virtual reality content items). For example, in some embodiments, the celestial module 310 can generate respective celestial representations for some, or all, of the scenes captured in the content item. As mentioned, views of a scene can be captured by cameras placed at particular locations and/or positions. The video streams (or feeds) captured by these cameras can be stitched together to provide an immersive view of the scene (e.g., 180 degree, 225 degree, 360 degree, etc.). When constructing a celestial representation of a scene, any audio-based points of interest from which sound originates during presentation of the scene can be plotted as objects (e.g., planets) in three-dimensional space. In some embodiments, the celestial representation of the scene is modeled in the shape of a sphere and the planets are plotted with respect to the sphere. These audio-based points of interest generally correspond to sound that originates in any of the video streams that capture views of the scene. In some embodiments, the planets can each be assigned a respective mass based on the popularity of their corresponding audio-based point of interest. For example, a scene may include a first audio-based point of interest and a second audio-based point of interest. Based on historical data, the first audio-based point of interest may have received a greater number of views than the second audio-based point of interest. In this example, a planet corresponding to the first audio-based point of interest will have a greater mass than a planet corresponding to the second audio-based point of interest.

In some embodiments, celestial representations generated for scenes of content items can be compressed and sent to user computing devices in advance. In such embodiments, the celestial representations for scenes of a given content item can be used to predict user view directions during presentation of the content item as described above. In some embodiments, a video stream of the content item that corresponds to a predicted view direction can be provided for presentation at a first (e.g., higher) video quality while video streams corresponding to the remaining view directions of the content item can be provided at a second (e.g., lower) video quality.

The head prediction module 312 can be configured to use the celestial model generated for the content item to make head tracking (or viewport tracking) predictions. For example, the content item for which the celestial model was generated can be accessed through a computing device being operated by a user. When a given scene is being presented, a simulation can be performed using the celestial representation for the scene. For example, an object that corresponds to the user's focal point can be positioned in the celestial representation. The user's focal point generally corresponds to the direction being viewed by the user. The focal point may be determined, for example, based on a direction corresponding to a viewport associated with the computing device. The simulation can be performed to predict changes to the object's position in the celestial representation. In this simulation, each of the planets in the celestial representation (which correspond to audio-based points of interest in the scene) exert a corresponding gravitational pull on the object in three-dimensional space. The amount of gravity exerted by a given planet can be determined based on the planet's mass and the distance between the planet and the object. The object will typically move toward a planet upon completion of the simulation. The planet (e.g., audio-based point of interest) to which the object moves toward by some threshold amount can be correlated to a region in the scene. This region is predicted to be the location to where the user's attention is likely to be drawn during presentation of the scene. In general, the parameters used in performing the simulation are tunable and need not correspond to real world values. More details describing the simulation will be provided below in reference to FIG. 5.

Figure 4A:
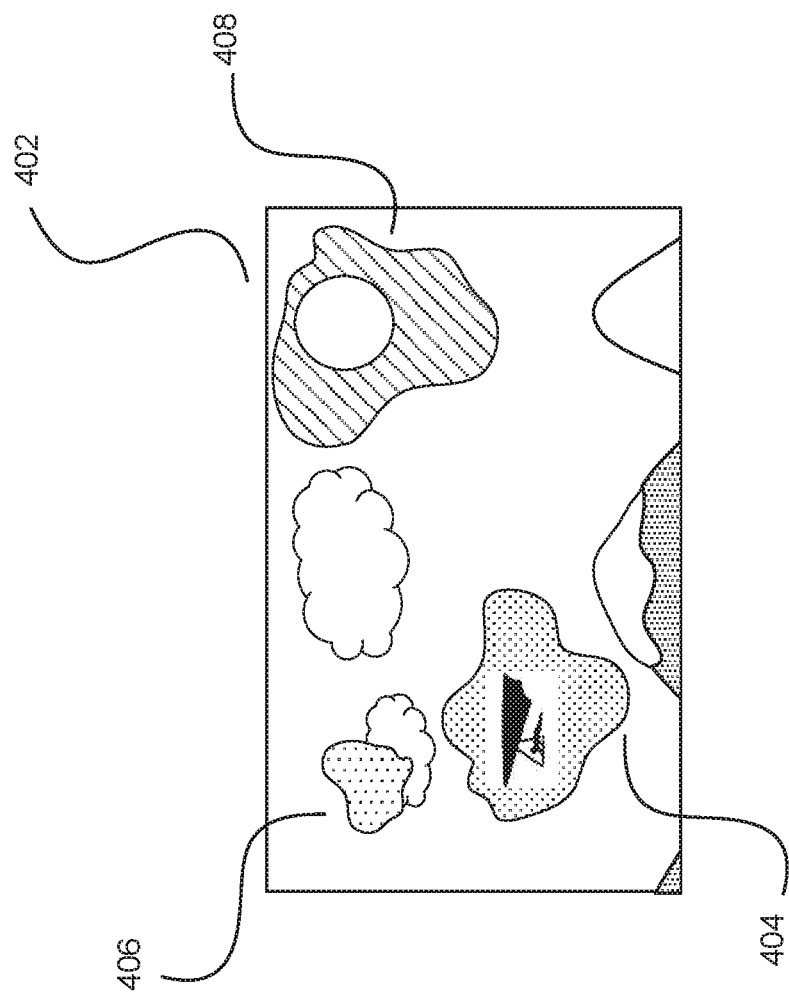
Figure 4B:
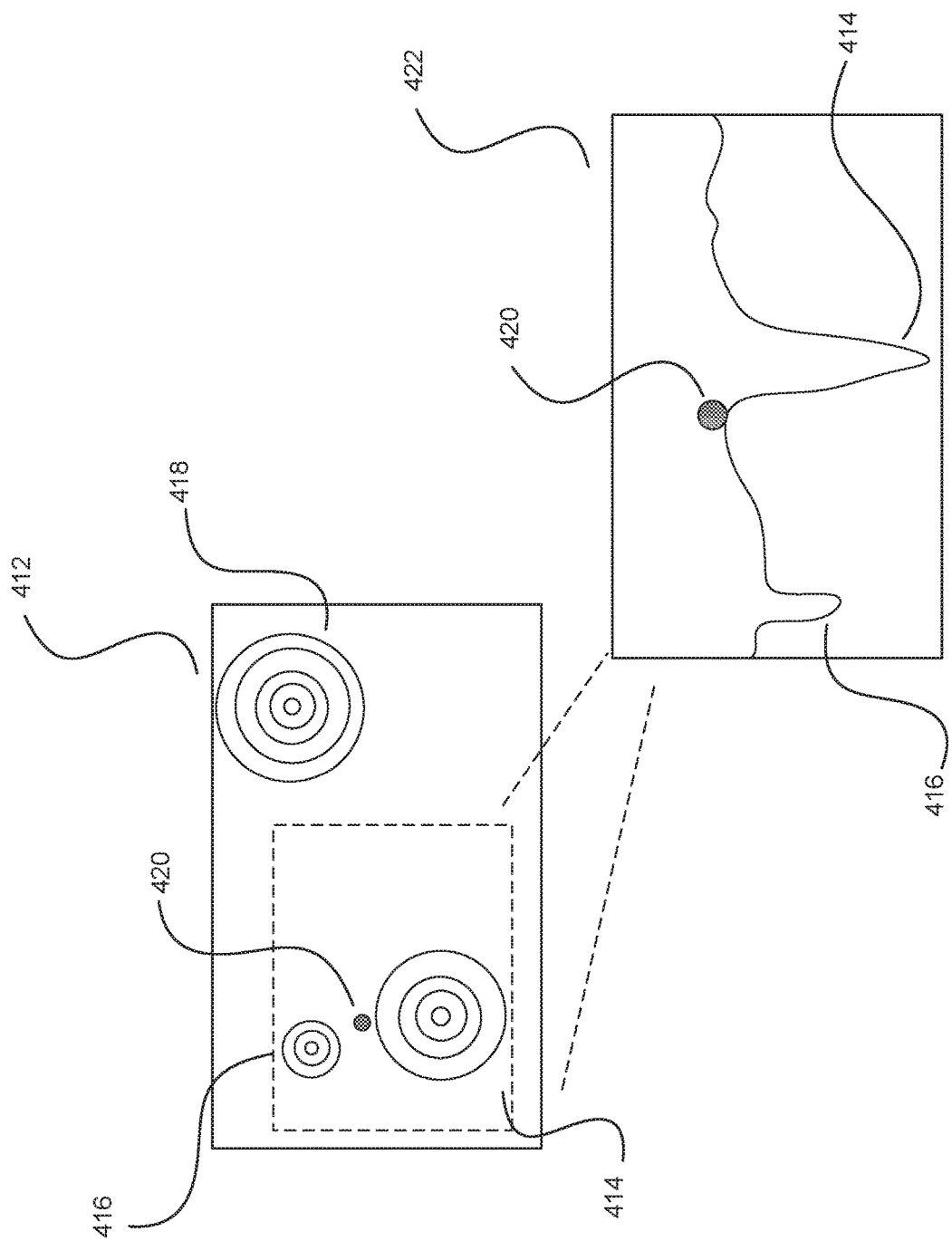

FIGS. 4A-D illustrate examples of performing head tracking prediction using a landscape model, according to an embodiment of the present disclosure. FIG. 4A illustrates an example heat map 402 corresponding to a frame of a content item. In some embodiments, the heat map 402 can describe aggregated user view activity for the frame. In the example of FIG. 4A, the heat map 402 indicates that, when presented with the frame, users viewed a first region 404, a second region 406, and a third region 408 in the frame. In this example, the third region 408 received the most number of views, followed by the first region 404, and lastly the second region 406. As mentioned, in some embodiments, a landscape representation 412 of the frame can be determined based on the heat map 402, as illustrated in the example of FIG. 4B.

FIG. 4B illustrates an overhead view of the landscape representation 412 for ease of explanation. In some embodiments, the landscape representation 412 of the frame is modeled in the shape of a sphere. As shown, the landscape representation 412 provides a landscape topology for the frame as determined based on the heat map 402. In some embodiments, popular regions of the frame that were viewed more frequently are represented in the landscape representation 412 as valleys and unpopular regions of the frame that were viewed less frequently are represented as peaks. For example, a region that received more views than other regions in the frame can be represented as a valley. In some embodiments, the depth of this valley is a measure of the number of views that correspond to the region, as determined from the heat map 402. Similarly, a region that received fewer views than other regions in the frame can be represented as a peak. In some embodiments, the height of this peak is a measure of the number of views that correspond to the region, as determined from the heat map 402. In the example of FIG. 4B, a valley 414 was constructed for the first region 404 of the frame, a valley 416 was constructed for the second region 406 of the frame, and a valley 418 was constructed for the third region 408 of the frame.

In various embodiments, a landscape model for the content item can be constructed by generating respective landscape representations for some, or all, of the frames of the content item. These landscape representations can be used to perform head tracking (or viewport tracking) predictions during presentation of the content item. For example, a simulation can be performed using the landscape representation 412 to predict where a user's attention is likely to be drawn while accessing the frame. To help visualize the simulation, FIG. 4B illustrates a two-dimensional representation 422 of a portion of the landscape representation 412. In this example, the two-dimensional representation 422 corresponds to a portion of the landscape representation 412 that is being accessed through the user's viewport. Further, the two-dimensional representation 422 includes the valley 414 that was constructed for the first region 404 of the frame and the valley 416 that was constructed for the second region 406 of the frame. In this example simulation, a particle 420 that corresponds to the user's focal point is positioned in the landscape representation 412. In general, the user's focal point corresponds to the direction being viewed by the user (e.g., viewport direction). The example simulation is performed to determine which direction the particle 420 will move in the landscape representation 412. The movement of the particle 420 in the landscape representation 412 can be determined by simulating the application of various forces to the particle 420.

Figure 4D:
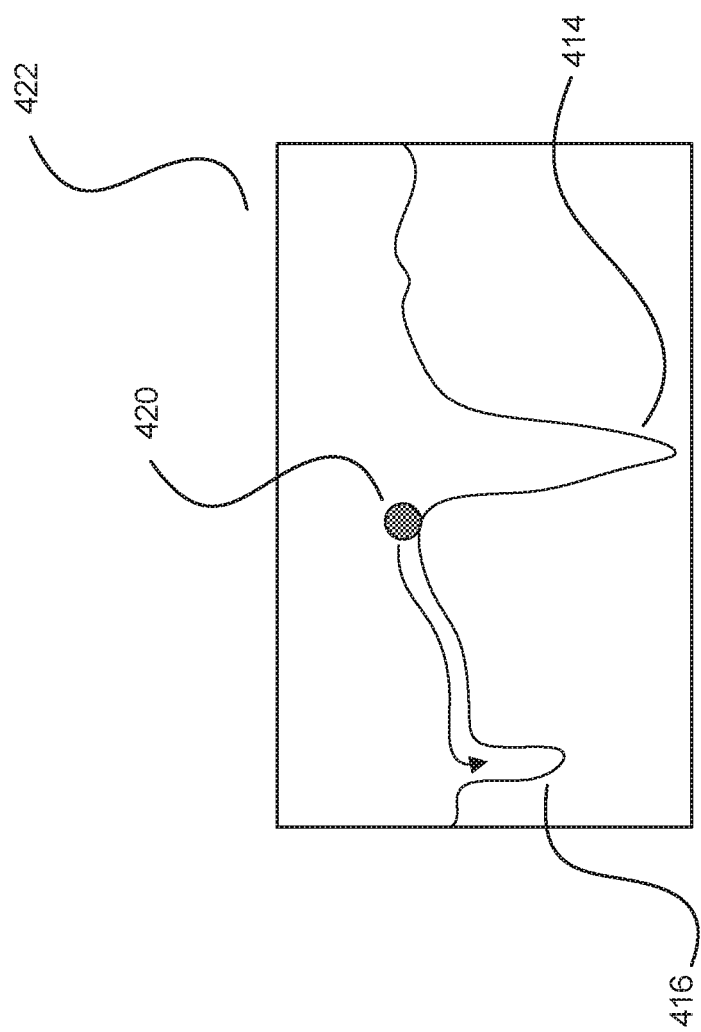

In various embodiments, the direction in which the particle 420 moves can be affected by an initial velocity and acceleration of the particle 420. In some embodiments, this initial velocity and acceleration may be measured based on a velocity and acceleration corresponding to the user's head movement as measured using the computing device through which the content item is being accessed. In some embodiments, the direction in which the particle moves can also be affected by a gravitational force that is simulated with respect to the landscape representation 412 of the frame. Further, the movement of the particle 420 can also be affected based on a gradient of the landscape representation 412 in which the particle 420 was initially positioned. For example, FIG. 4C illustrates the particle 420 falling into the valley 414 which corresponds to the first region 404 of the frame. In this example, the movement of the particle 420 can be influenced by the simulated gravity and gradient. Once the simulation is complete, the resulting position of the particle 420 in the landscape representation 412 can be correlated back to the first region 404 in the frame. In this example, the user's attention is predicted to be drawn to the first region 404 in the frame. In another example, FIG. 4D illustrates the particle 420 falling into the valley 416 which corresponds to the second region 406 of the frame. In this example, the movement of the particle 420 is influenced by the initial velocity and acceleration of the particular 420 which exerts a greater force than the simulated gravity and gradient. Here, the resulting position of the particle 420 in the landscape representation 412 can be correlated back to the second region 406 in the frame. In this example, the user's attention is predicted to be drawn to the second region 406 in the frame.

Figure 5A:
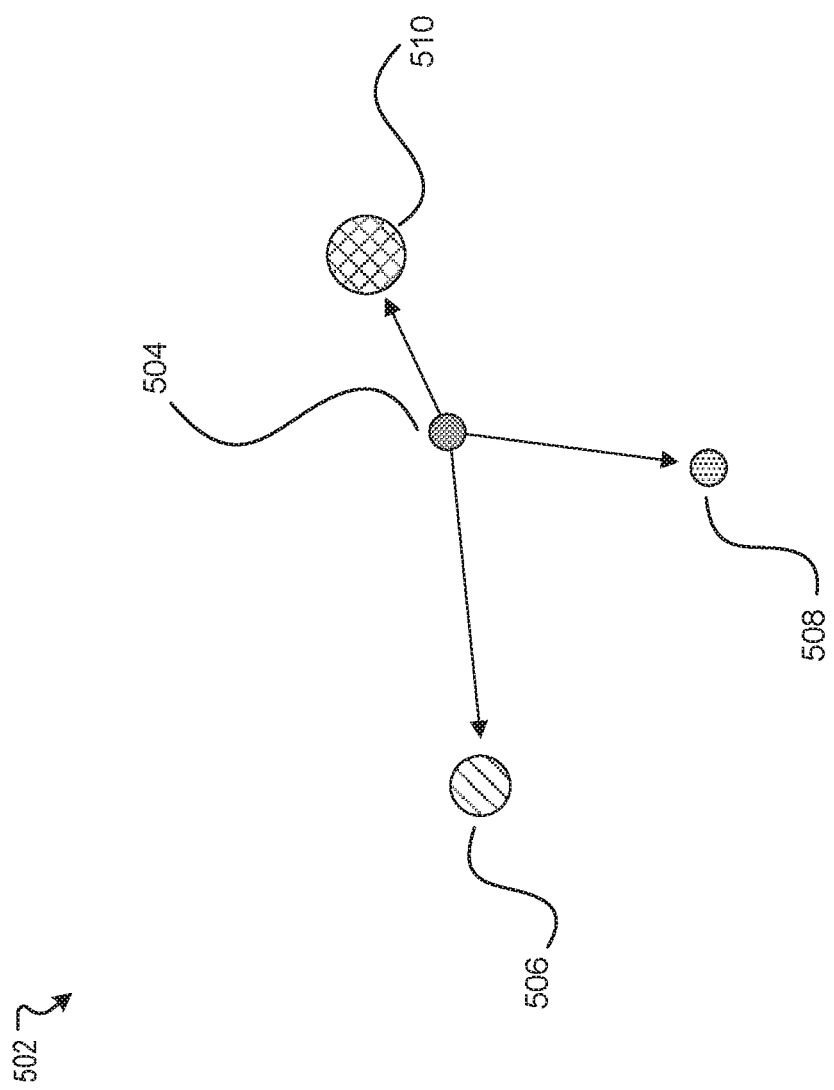
FIGS. 5A-B illustrate examples of performing head tracking prediction using a celestial model, according to an embodiment of the present disclosure.
Figure 5B:
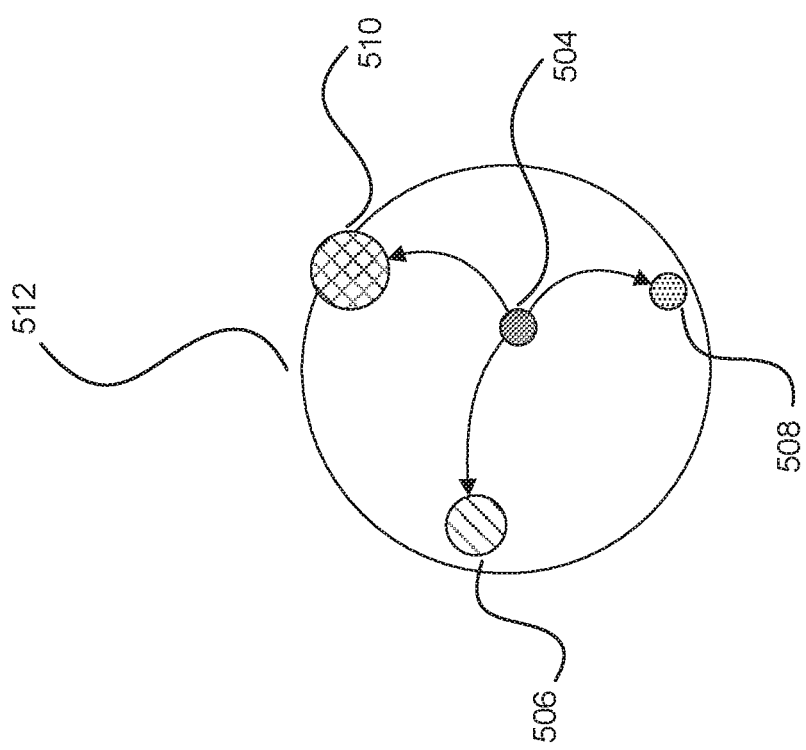

FIGS. 5A-B illustrate examples of performing head tracking prediction using a celestial model, according to an embodiment of the present disclosure. FIG. 5A illustrates a celestial representation 502 of a scene in a content item. The celestial representation 502 plots planets that correspond to audio-based points of interest in three-dimensional space. In the example of FIG. 5A, the celestial representation 502 includes a first planet 506 that corresponds to a first audio-based point of interest in the scene, a second planet 508 that corresponds to a second audio-based point of interest in the scene, and a third planet 510 that corresponds to a third audio-based point of interest in the scene. The celestial representation also plots an object 504 that corresponds to a user's focal point during presentation of the scene. In some embodiments, the planets can each be assigned a respective mass based on the popularity of their corresponding audio-based point of interest. For example, the first planet 506 can be assigned a first mass, the second planet 508 can be assigned a second mass, and the third planet 510 can be assigned a third mass. In some embodiments, the object 504 is assigned a pre-determined (or specified) mass.

A simulation can be performed using the celestial representation 502 to determine which planet the object 504 will move towards. In this simulation, each of the planets (the first planet 506, the second planet 508, the third planet 510) in the celestial representation exert a corresponding gravitational pull on the object 504 in three-dimensional space. The amount of gravity exerted by a given planet can be determined based on the planet's mass and the distance between the planet and the object 504. One example formula for measuring the force of gravitational attraction between a planet and the particle is as follows:

$$F = \frac{G(M*m)}{d^2}$$

where F is the force of gravity, G is the gravitational parameter, M is the mass of the planet, and m is the mass of the object 504, and d is the distance between the planet and the object 504.

The object 504 will typically move toward a planet upon completion of the simulation. The planet to which the object moves toward by some threshold amount can be correlated to a region in the scene. This region is predicted to be the location to where the user's attention is likely to be drawn during presentation of the scene. In the example of FIG. 5A, the third planet 510 has the largest mass and the shortest distance to the object 504. As a result, the object 504 will move toward the third planet 510. As mentioned, the third planet 510 corresponds to a third audio-based point of interest in the scene. A region in the scene that corresponds to the third audio-based point of interest can be determined. This region can then be identified as a location that is likely to be viewed by the user during presentation of the content item.

As mentioned, in some embodiments, the celestial representation 502 of the scene can be modeled in the shape of a sphere 512. In such embodiments, the planets are plotted with respect to the sphere 512, as illustrated in the example of FIG. 5B. This approach may be used, for example, if the scene was captured as a spherical video. In this example, a simulation can be performed using the sphere 512 to determine which planet the object 504 will move towards, as described above.

Figure 6A:
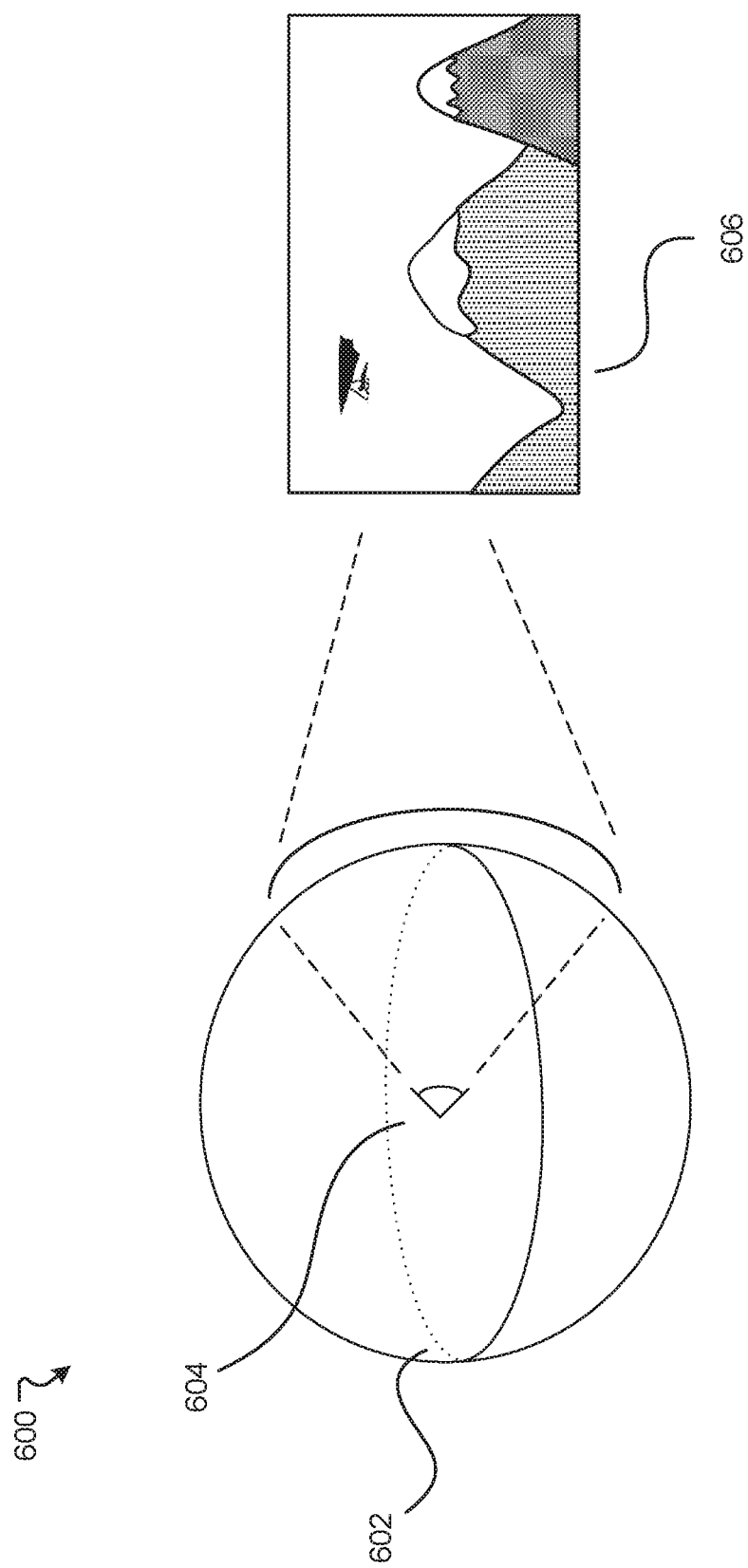
FIGS. 6A-B illustrate examples of streaming a virtual reality content item, according to an embodiment of the present disclosure.
Figure 6B:
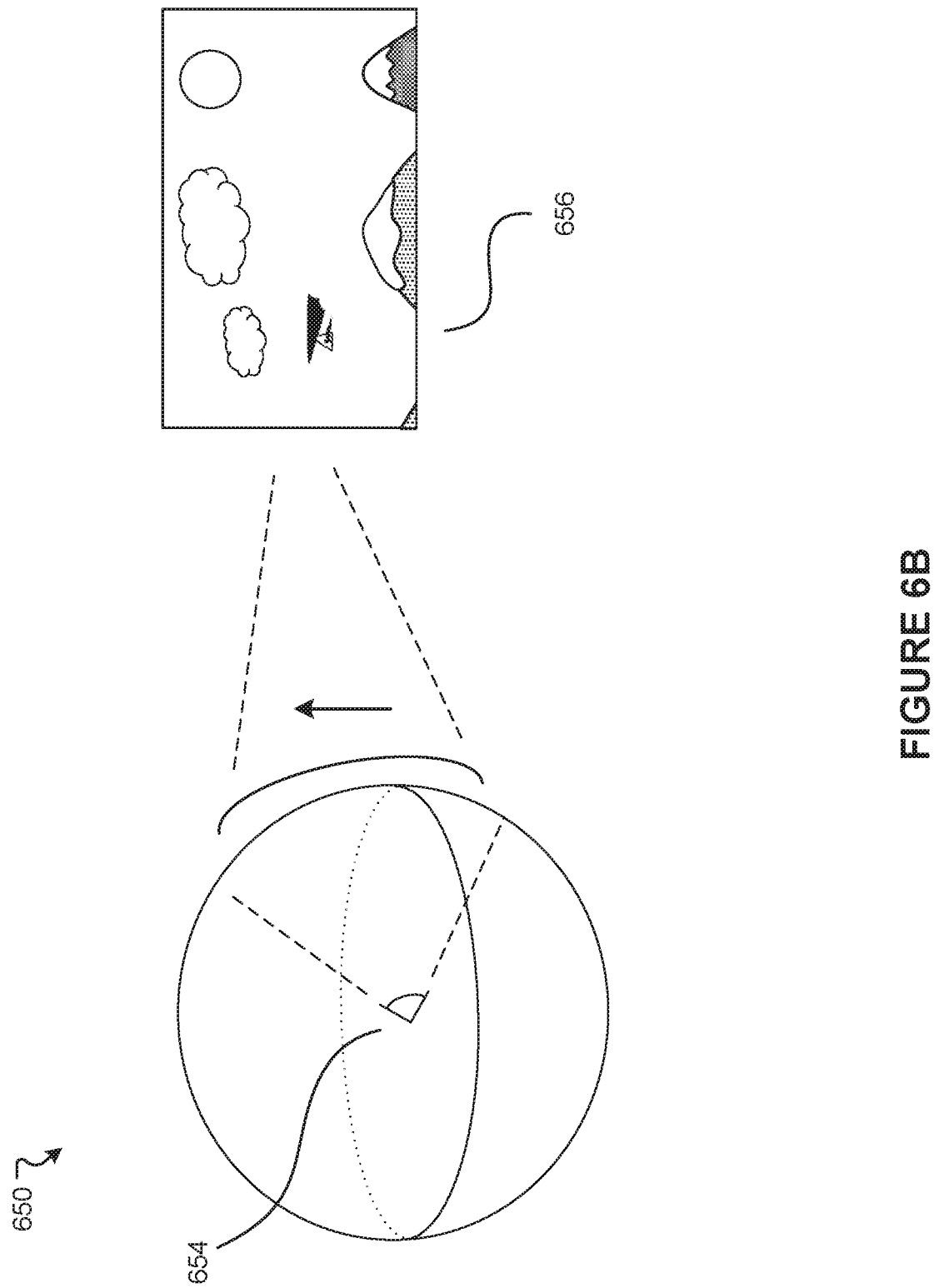

FIG. 6A-B illustrate examples of streaming a virtual reality content item, according to an embodiment of the present disclosure. FIG. 6A illustrates an example 600 of a viewport 604 displaying a portion of a video stream 606 of a spherical video. The viewport 604 is shown in the diagram of FIG. 6A as being positioned within a representation 602 of a spherical video to facilitate understanding of the various embodiments described herein. In some embodiments, a spherical video captures a 360-degree view of a scene (e.g., a three-dimensional scene). The spherical video can be created by stitching together various video streams, or feeds, that were captured by cameras positioned at particular locations and/or positions to capture a 360 degree view of the scene.

Once stitched together, a user can access, or playback, the spherical video through a viewport 604 to view a portion of the spherical video at some angle. The viewport 604 may be accessed through a software application (e.g., video player software) running on a computing device. The stitched spherical video can be projected as a sphere, as illustrated by the representation 602. Generally, while accessing the spherical video, the user can change the direction (e.g., pitch, yaw, roll) of the viewport 604 to access another portion of the scene captured by the spherical video. FIG. 6B illustrates an example 650 in which the direction of the viewport 654 has changed in an upward direction (as compared to viewport 604). As a result, the video stream 656 of the spherical video being accessed through the viewport 654 has been updated (e.g., as compared to video stream 606) to show the portion of the spherical video that corresponds to the updated viewport direction.

The direction of the viewport 604 may be changed in various ways depending on the implementation. For example, while accessing the spherical video, the user may change the direction of the viewport 604 using a mouse or similar device or through a gesture recognized by the computing device. As the direction changes, the viewport 604 can be provided a stream corresponding to that direction, for example, from a content provider system. In another example, while accessing the spherical video through a display screen of a mobile device, the user may change the direction of the viewport 604 by changing the direction (e.g., pitch, yaw, roll) of the mobile device as determined, for example, using gyroscopes, accelerometers, touch sensors, and/or inertial measurement units in the mobile device. Further, if accessing the spherical video through a virtual reality head mounted display, the user may change the direction of the viewport 604 by changing the direction of the user's head (e.g., pitch, yaw, roll). Naturally, other approaches may be utilized for navigating presentation of a spherical video including, for example, touch screen or other suitable gestures.

In some embodiments, the stream(s) are provided in real-time based on the determined direction of the viewport 604. For example, when the direction of the viewport 604 changes to a new position, the computing device through which the viewport 604 is being accessed and/or the content provider system can determine the new position of the viewport 604 and the content provider system can send, to the computing device, stream data corresponding to the new position. Thus, in such embodiments, each change in the viewport 604 position is monitored, in real-time (e.g., constantly or at specified time intervals) and information associated with the change is provided to the content provider system such that the content provider system may send the appropriate stream that corresponds to the change in direction.

Figure 7:
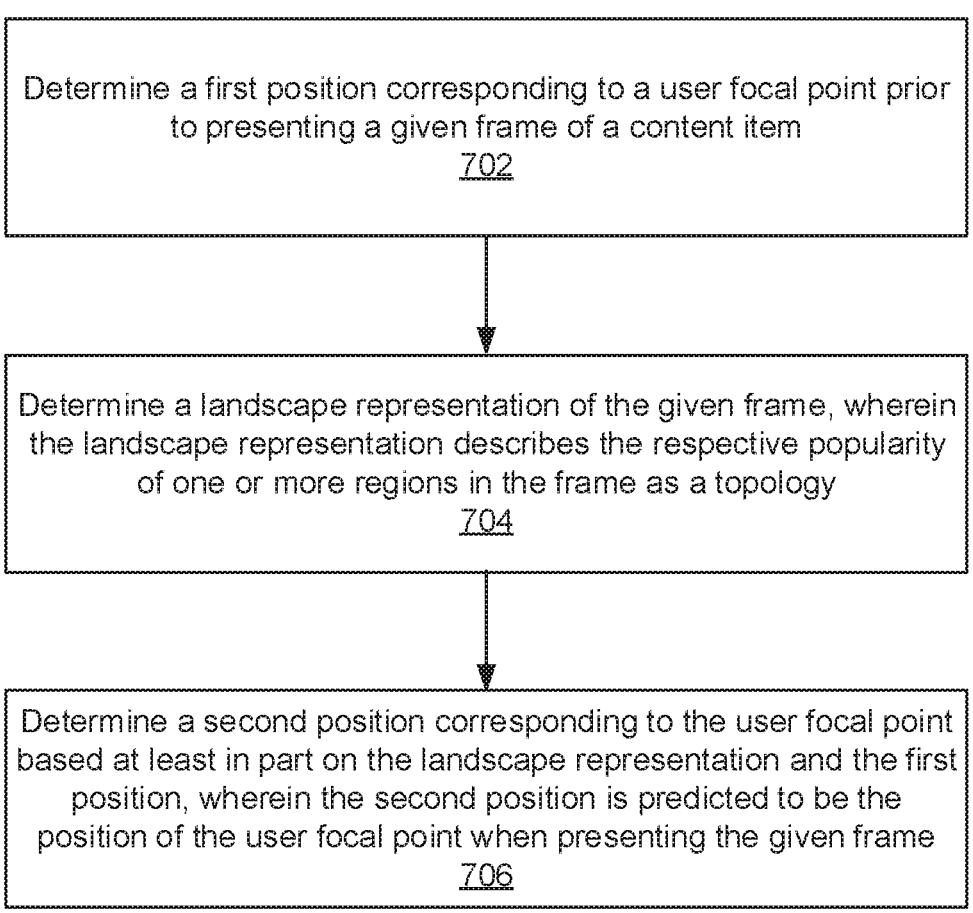
FIG. 7 illustrates an example method, according to an embodiment of the present disclosure.

FIG. 7 illustrates an example method 700, according to an embodiment of the present disclosure. It should be appreciated that there can be additional, fewer, or alternative steps performed in similar or alternative orders, or in parallel, within the scope of the various embodiments discussed herein unless otherwise stated.

At block 702, a first position corresponding to a user focal point prior to presenting a given frame of a content item is determined. At block 704, a landscape representation of the given frame is determined. The landscape representation describes the respective popularity of one or more regions in the frame as a topology. At block 706, a second position corresponding to the user focal point is determined based at least in part on the landscape representation and the first position. The second position is predicted to be the position of the user focal point when presenting the given frame.

Figure 8:
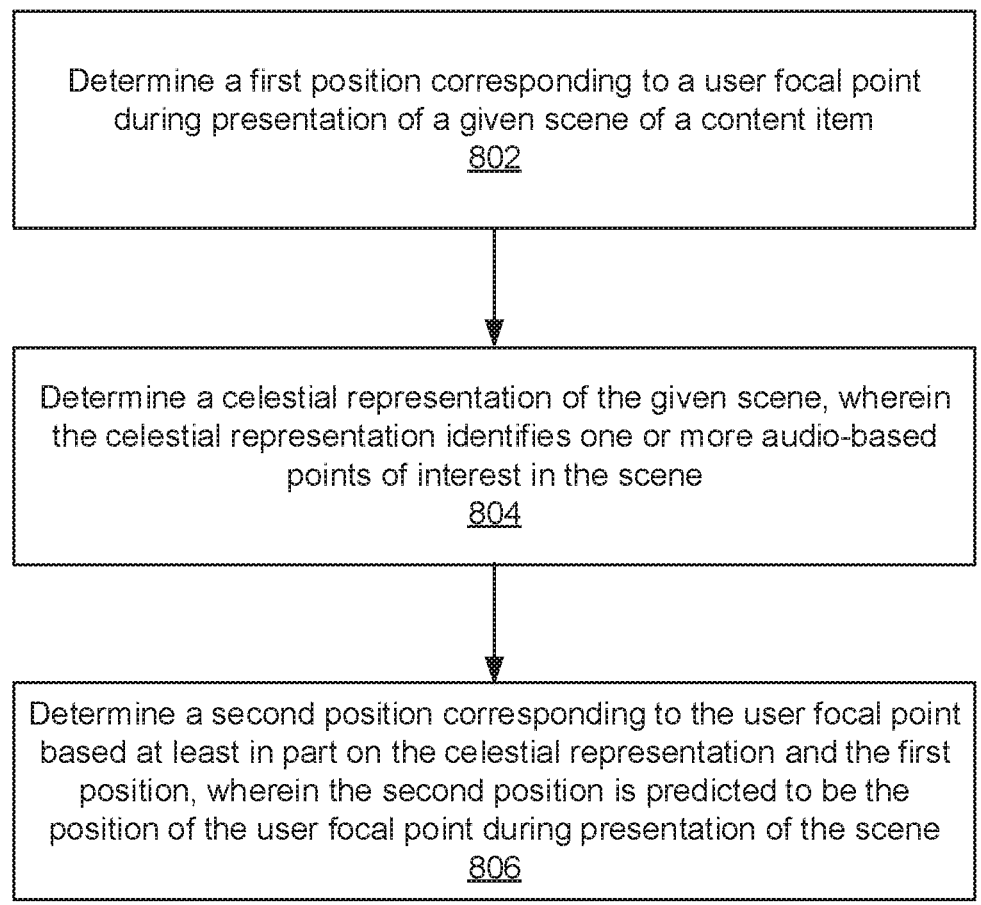
FIG. 8 illustrates another example method, according to an embodiment of the present disclosure.

FIG. 8 illustrates an example method 800, according to an embodiment of the present disclosure. It should be appreciated that there can be additional, fewer, or alternative steps performed in similar or alternative orders, or in parallel, within the scope of the various embodiments discussed herein unless otherwise stated.

At block 802, a first position corresponding to a user focal point during presentation of a given scene of a content item is determined. At block 804, a celestial representation of the given scene is determined. The celestial representation identifies one or more audio-based points of interest in the scene. At block 806, a second position corresponding to the user focal point is determined based at least in part on the celestial representation and the first position. The second position is predicted to be the position of the user focal point during presentation of the scene.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 9:
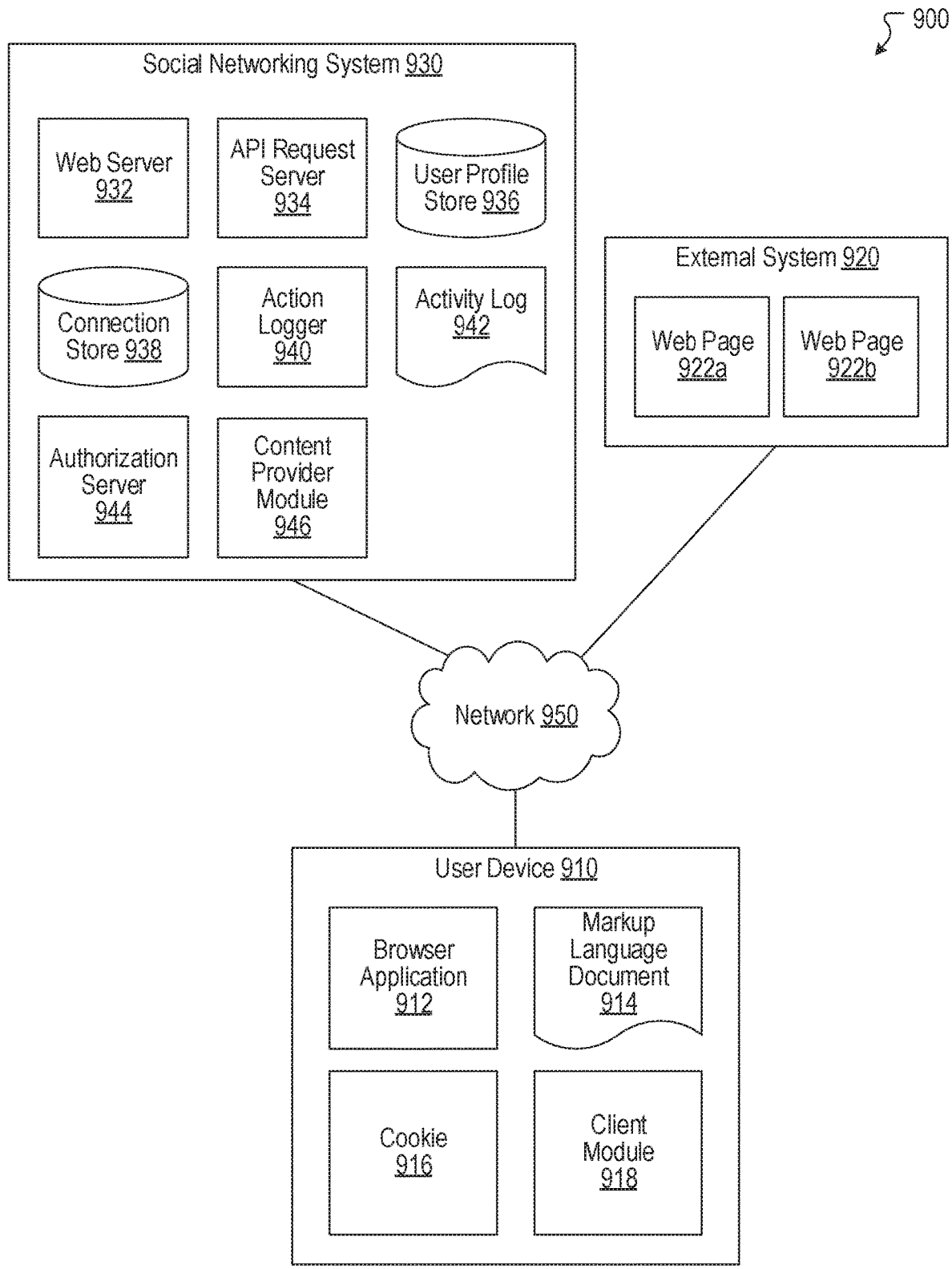
FIG. 9 illustrates a network diagram of an example system including an example social networking system that can be utilized in various scenarios, according to an embodiment of the present disclosure.

FIG. 9 illustrates a network diagram of an example system 900 that can be utilized in various scenarios, in accordance with an embodiment of the present disclosure. The system 900 includes one or more user devices 910, one or more external systems 920, a social networking system (or service) 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices (or systems) that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the Silverlight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content. As discussed previously, it should be appreciated that there can be many variations or other possibilities.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

In some embodiments, the social networking system 930 can include a content provider module 946. The content provider module 946 can, for example, be implemented as the content provider module 102 of FIG. 1. In some embodiments, the content provider module 946, or some of its features, can be implemented in a computing device, e.g., the user device 910. In some embodiments, the user device 910 can include a client module 918. The client module 918 can, for example, be implemented as the client module 114 of FIG. 1. The network 950 can, for example, be implemented as the network 150 of FIG. 1. As discussed previously, it should be appreciated that there can be many variations or other possibilities.

Hardware Implementation

Figure 10:
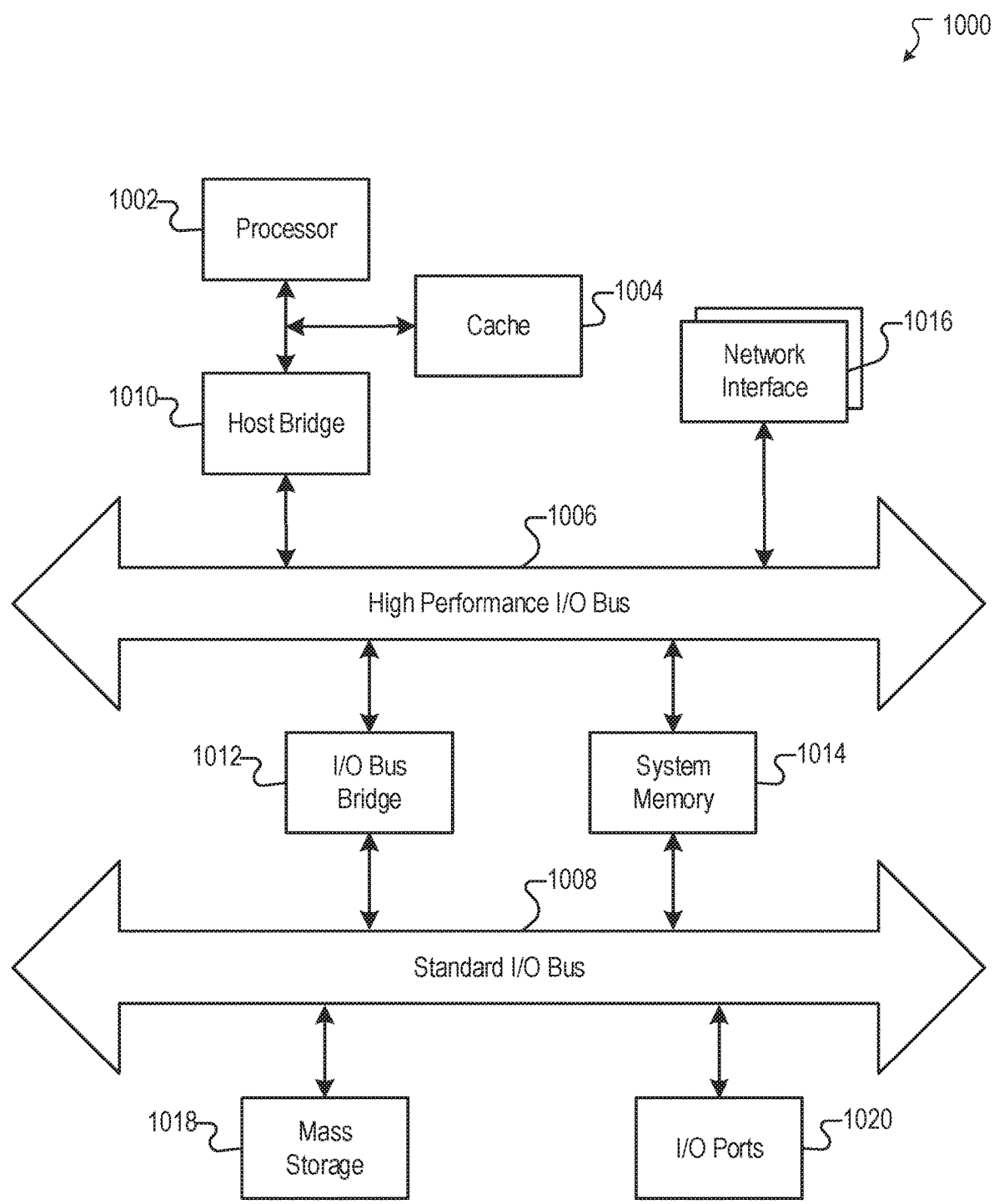
FIG. 10 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system

1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 930, the user device 910, and the external system 1020, or a component thereof. In an embodiment of the invention, the computer system 1000 may be one server among many that constitutes all or part of the social networking system 930.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Moreover, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    determining, by a computing system, a first position corresponding to a user focal point during presentation of a given scene of a content item;
    determining, by the computing system, a celestial representation of the given scene, wherein the celestial representation identifies one or more audio-based points of interest in the scene, the determining comprising:
        plotting, by the computing system, the audio-based points of interest as planets in three-dimensional space; and
    determining, by the computing system, a second position corresponding to the user focal point based at least in part on the celestial representation and the first position, wherein the second position is predicted to be the position of the user focal point during presentation of the scene, the determining further comprising:
        applying, by the computing system, a simulation using the celestial representation and an object placed in the celestial representation at the first position, wherein the simulation causes the object to move toward at least one planet in the celestial representation, wherein the second position is determined based on an audio-based point of interest corresponding to the at least one planet.

2. The computer-implemented method of claim 1, wherein the user focal point corresponds to a direction of a viewport through which the scene of the content item is presented.

3. The computer-implemented method of claim 1, wherein determining the celestial representation of the given scene further comprises:
    determining, by the computing system, the one or more audio-based points of interest in the scene based at least in part on one or more spatial audio streams corresponding to the content item; and
    determining, by the computing system, a respective popularity for each of the audio-based points of interest.

4. The computer-implemented method of claim 3, wherein each audio-based point of interest corresponds to a region in the scene from which sound originates.

5. The computer-implemented method of claim 3, wherein the popularity of an audio-based point of interest is determined based on the number of times a region corresponding to the audio-based point of interest was historically viewed.

6. The computer-implemented method of claim 3, wherein a planet corresponding to an audio-based point of interest is assigned a mass, and wherein the mass is based on the popularity of the audio-based point of interest.

7. The computer-implemented method of claim 1, wherein determining the second position corresponding to the user focal point based at least in part on the celestial representation and the first position further comprises:
    applying, by the computing system, a simulation using the celestial representation and an object placed in the celestial representation at the first position, wherein the simulation causes the object to move toward at least one planet in the celestial representation, wherein the second position is determined based on an audio-based point of interest corresponding to the planet.

8. The computer-implemented method of claim 7, wherein applying the simulation further comprises:
    determining, by the computing system, the audio-based point of interest that corresponds to the planet to which the object moves toward;
    determining, by the computing system, a region in the scene corresponding to the audio-based point of interest; and
    identifying, by the computing system, the region as the second position.

9. The computer-implemented method of claim 7, wherein each planet in the celestial representation exerts a simulated gravitational pull on the object.

10. The computer-implemented method of claim 1, wherein the scene of the content item is created by stitching together a set of video streams that capture views of the scene.

11. A system comprising:
    at least one processor; and
    a memory storing instructions that, when executed by the at least one processor, cause the system to perform:
        determining a first position corresponding to a user focal point during presentation of a given scene of a content item;
        determining a celestial representation of the given scene, wherein the celestial representation identifies one or more audio-based points of interest in the scene, the determining comprising:
            plotting the audio-based points of interest as planets in three-dimensional space; and determining a second position corresponding to the user focal point based at least in part on the celestial representation and the first position, wherein the second position is predicted to be the position of the user focal point during presentation of the scene, the determining further comprising:

applying a simulation using the celestial representation and an object placed in the celestial representation at the first position, wherein the simulation causes the object to move toward at least one planet in the celestial representation, wherein the second position is determined based on an audio-based point of interest corresponding to the at least one planet.

12. The system of claim 11, wherein the user focal point corresponds to a direction of a viewport through which the scene of the content item is presented.

13. The system of claim 11, wherein determining the celestial representation of the given scene further causes the system to perform:

determining the one or more audio-based points of interest in the scene based at least in part on one or more spatial audio streams corresponding to the content item;

determining a respective popularity for each of the audio-based points of interest.

14. The system of claim 13, wherein each audio-based point of interest corresponds to a region in the scene from which sound originates.

15. The system of claim 13, wherein the popularity of an audio-based point of interest is determined based on the number of times a region corresponding to the audio-based point of interest was historically viewed.

16. A non-transitory computer-readable storage medium including instructions that, when executed by at least one processor of a computing system, cause the computing system to perform a method comprising:

determining a first position corresponding to a user focal point during presentation of a given scene of a content item;

determining a celestial representation of the given scene, wherein the celestial representation identifies one or more audio-based points of interest in the scene, the determining comprising:

plotting the audio-based points of interest as planets in three-dimensional space; and determining a second position corresponding to the user focal point based at least in part on the celestial representation and the first position, wherein the second position is predicted to be the position of the user focal point during presentation of the scene, the determining further comprising:

applying a simulation using the celestial representation and an object placed in the celestial representation at the first position, wherein the simulation causes the object to move toward at least one planet in the celestial representation, wherein the second position is determined based on an audio-based point of interest corresponding to the at least one planet.

17. The non-transitory computer-readable storage medium of claim 16, wherein the user focal point corresponds to a direction of a viewport through which the scene of the content item is presented.

18. The non-transitory computer-readable storage medium of claim 16, wherein determining the celestial representation of the given scene further causes the system to perform:

determining the one or more audio-based points of interest in the scene based at least in part on one or more spatial audio streams corresponding to the content item;

determining a respective popularity for each of the audio-based points of interest.

19. The non-transitory computer-readable storage medium of claim 18, wherein each audio-based point of interest corresponds to a region in the scene from which sound originates.

20. The non-transitory computer-readable storage medium of claim 18, wherein the popularity of an audio-based point of interest is determined based on the number of times a region corresponding to the audio-based point of interest was historically viewed.

* * * * *